No. 814,528. PATENTED MAR. 6, 1906.
Z. T. FURBISH.
RATCHET TOOL.
APPLICATION FILED MAR. 25, 1903.
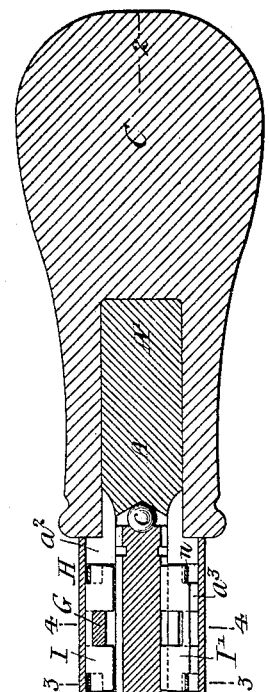
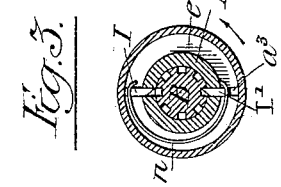
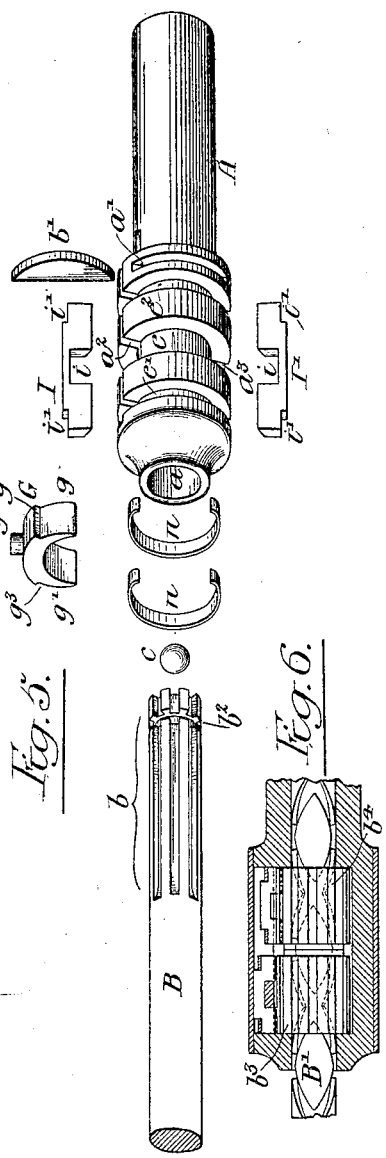
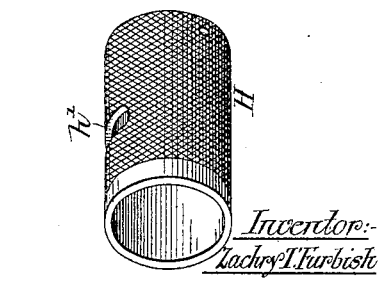

UNITED STATES PATENT OFFICE.

ZACHRY T. FURBISH, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

RATCHET-TOOL.

No. 814,528.     Specification of Letters Patent.     Patented March 6, 1906.

Application filed March 25, 1903. Serial No. 149,524.

*To all whom it may concern:*

Be it known that I, ZACHRY T. FURBISH, a citizen of the United States, residing in Philadelphia, Pennsylvania, have invented certain Improvements in Ratchet-Tools, of which the following is a specification.

The main object of my invention is to construct a cheap and substantial ratchet screwdriver in which the pawls will be bodily movable from or toward the ratchet-teeth.

A further object of the invention is to provide a thrust-bearing for the spindle, so that it will be always held central even if the body of the driver is slightly strained.

My invention is especially applicable as a ratchet screw-driver; but it may be used for any suitable tool without departing from my invention.

In the accompanying drawings, Figure 1 is a longitudinal sectional view of a screwdriver illustrating my invention. Fig. 2 is a longitudinal sectional view on the line 2 2, Fig. 1. Fig. 3 is a transverse section on the line 3 3, Fig. 1. Fig. 4 is a transverse sectional view on the line 4 4, Fig. 1. Fig. 5 is a perspective view showing the parts detached, and Fig. 6 is a view showing my invention applied to a spiral tool.

A is the body of the tool, having a shank A', which is driven into the handle C and secured thereto in any suitable manner.

B is the spindle of the screw-driver, having formed at its inner end in the present instance a ratchet-wheel $b$. This ratchet-wheel may in some instances be made separate and secured to the spindle B.

In the body A is a recess $a'$, in which is a plate $b'$, which fits in a recess $b^2$ in the spindle B and locks the spindle to the body A. The end of the spindle B fits snugly in the opening $a$ in the body A, and between the bottom of this opening and the end of the spindle is a ball $c$, resting in a socket in the body A and in the end of the spindle B; so that when the screw-driver is used and pressure is applied to the handle the thrust will be taken by this ball, thus relieving friction. At the same time the ball will keep the spindle central in respect to the handle, so that the ratchet-wheel always has the same relation to the pawls, which is very essential in this class of tools, owing to the fact that the parts must be made so small that if there is a loose fit of the spindle in the body the pawls are liable in time to slip.

$a^2 a^3$ are two radial slots formed in the body A, and $e\ e'\ e^2$ are three annular grooves in the body. Mounted in the slots $a^2\ a^3$ are the pawls I I', respectively. Each pawl has a recess $i$ at the center and is notched at each end at $i'\ i'$ and has two beveled edges on each side of the central recess, which engage the ratchet-teeth on the spindle B. Arranged to slide in the annular groove $e$ is a segmental cam G, having tapered arms $g\ g'$ at each end, as shown in Figs. 4 and 5. The cam-block and the pawls are held in position on the body A by means of a casing H, which is secured to the body by means of a screw $h$. The casing has a slot $h'$, and a pin $g^2$ on the block G extends through the slot, so that the block can be readily shifted to throw either one of the pawls out of engagement with the ratchet-wheel. The arms of the cam G are flat on their upper surfaces and have a broad bearing against the base of the recess in each pawl, so that when either pawl is raised by the cam it moves bodily out of engagement with the ratchet-teeth remaining parallel therewith. The cam G is provided with shoulders $g^3$, which when the cam is moved in either direction strike against the pawls, and thus limit the movement of the cam. These shoulders may be dispensed with in some instances, and the pin $g^2$ may act as a stop. Springs $n\ n$ are mounted in the grooves $e'\ e^2$ and rest in the notches $i'$ of the pawls I I', as clearly shown in Fig. 3, and these springs tend to force the pawls in engagement with the ratchet $b$ on the spindle B. The ends of the springs are slightly bent, so that they will engage the pawls and retain their position when the tool is being assembled. It will be noticed in referring to Figs. 3 and 5 that the ends of the pawls are beveled in opposite directions, so that one pawl will be used in turning the screw-driver to the right and the other to the left.

The operation of the tool is as follows: When the parts are assembled and the cam-block G moved to the position shown in the drawings, the pawl I is clear of the ratchet and the pawl I' engages the ratchet, so that when the handle is turned in the direction of the arrow, Fig. 3, it will also turn the spindle B of the screwdriver, but when the handle is turned in the reverse direction the pawl will simply slide over the ratchet-teeth without turning the spindle. When it is wished to reverse the motion, the block G is moved, so that the cam *g* will enter the recess *i* in the pawl I', moving the pawl out of engagement with the ratchet-teeth and releasing the pawl I, so that the springs *n n* will force the pawl I into engagement with the ratchet-teeth. Then if the handle is turned in the reverse direction to that shown by the arrow in Fig. 3 the spindle B will turn with the handle, but will not turn with it when the handle is reversed. If it is desired to lock the spindle rigidly to the handle, then the block G is moved to the mid-position, allowing the springs *n n* to force both pawls into engagement with the ratchet-teeth, so that the handle is locked by both pawls. In some instances the casing H may be loose on the body A and secured to the cam-block G, so that on turning the casing the cam-block can be moved, so as to engage the pawls, the cam-block preventing the casing moving longitudinally.

It will be understood that my improved ratchet mechanism may be used on a tool having a spiral spindle B', on which are mounted one or two ratchet-wheels $b^3 b^4$, having tongues entering the spiral grooves in the spindle. The pawls may be either beveled or plain, the latter forming a positive lock for the ratchet-wheel. (See Fig. 6.)

While I have illustrated a tool in which two pawls are used, a single pawl may be used in some instances without departing from the main feature of my invention.

I claim as my invention—

1. The combination in a ratchet-tool of a body portion having a slot and an annular groove, a spindle provided with a toothed portion, a bodily-movable pawl mounted in the slot and placed to engage the ratchet-teeth, with a cam slidably carried in the annular groove of the body portion and placed to engage said pawl in such manner as to bodily move the same while retaining it parallel to the lines of the ratchet-teeth, substantially as described.

2. The combination in a ratchet-tool, of a body portion having an opening therein, a spindle mounted in the opening and having ratchet-teeth, the body having radial slots and annular grooves, a bodily-movable pawl in each slot arranged to engage the ratchet-teeth of the spindle, springs for the pawls, and a cam mounted in one of the grooves of the body and arranged to bodily lift either one of the pawls out of engagement with the ratchet-teeth, substantially as described.

3. The combination of a body portion having an opening therein and having two radial slots communicating with the opening and also having three annular grooves, a spindle having ratchet-teeth therein, that portion of the spindle having the ratchet-teeth being in the opening of the body, pawls mounted in each slot, each pawl being recessed at the center, springs in the outer grooves of the body portion engaging the pawls, and a cam mounted in the central groove and having tapered arms arranged to pass into the recesses in the pawls and push the pawls away from the ratchet-teeth, substantially as described.

4. The combination of a body portion having an opening therein and radial slots extending from said opening and also having annular grooves, a spindle having ratchet-teeth thereon, the toothed portion of the spindle being in the opening of the body, a casing on the body portion, a pawl in each slot, each pawl having a central recess and notched at each end, a spring mounted in each end groove resting on the notched portions of the pawls, a cam mounted in the central groove and having tapered arms shaped to enter the recesses in the pawls and to move them away from the ratchet-wheels, substantially as described.

5. The combination of a body portion having an opening therein and radial slots extending from said opening and also having annular grooves, a spindle having ratchet-teeth thereon, the toothed portion of the spindle being in the opening of the body, a casing on the body portion, a pawl in each slot, each pawl having a central recess and notched at each end, a spring mounted in each end groove and resting on the notched portions of the pawls, a cam mounted in the central groove and having tapered arms shaped to enter the recesses in the pawls and to move them away from the ratchet-wheels, the ends of the springs being bent to engage the pawls, substantially as described.

6. The combination in a ratchet-tool, of a body portion having an opening, a spindle in said opening, a ratchet on said spindle, bodily-movable pawls extending substantially parallel to the spindle and a pair of segmental springs, one at each end of the pawls, for forcing the same into engagement with the ratchet, the ends of the springs being bent to engage the pawls, substantially as described.

7. The combination in a ratchet-tool, of a body portion, an opening therein, a spindle in said opening, a ratchet on the spindle, a pawl having a central recess, a cam having a flat surface and arranged to enter the recess and lift the pawl bodily out of engagement with the ratchet, substantially as described.

8. The combination in a ratchet-tool, of a body portion, an opening therein, a spindle in said opening, a ratchet on said spindle, two pawls, each pawl having a recess, a segmental cam having arms arranged to enter the recesses in the pawls and lift them out of engagement with the ratchet, said cam having shoulders acting as stops, substantially as described.

9. The combination in a ratchet-tool, of a body portion having a slot therein, a ratchet-wheel, a pawl therefor mounted in said slot of the body portion and movable bodily therein, a spring acting upon the pawl, and a cam for bodily moving said pawl in a line substantially radial to the axis of the ratchet-wheel into and out of engagement with said wheel, substantially as described.

10. The combination in a ratchet-tool of a body portion having a slot, a spindle provided with a toothed portion, an elongated bodily-movable pawl mounted in the slot so as to extend in a line substantially parallel to the line of the spindle and capable of engagement with the ratchet-teeth, with a cam carried by the body portion and shaped to be capable of causing movement of the pawl as a whole toward and from the spindle while retaining it parallel to the line of the ratchet-teeth, substantially as described.

In testimony whereof I have signed my name to this specification in the presence of two subscribing witnesses.

ZACHRY T. FURBISH.

Witnesses:
WILL. A. BARR,
JOS. H. KLEIN.